US009889896B2

(12) United States Patent
Nakamura et al.

(10) Patent No.: US 9,889,896 B2
(45) Date of Patent: Feb. 13, 2018

(54) ASSEMBLY METHOD FOR VEHICLE BODY AND ASSEMBLY DEVICE FOR SAME

(71) Applicant: HONDA MOTOR CO., LTD., Tokyo (JP)

(72) Inventors: Shinsuke Nakamura, Tochigi (JP); Hayato Sato, Tochigi (JP); Koichi Takeuchi, Tochigi (JP); Yasushi Watanabe, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 244 days.

(21) Appl. No.: 14/655,490

(22) PCT Filed: Dec. 25, 2013

(86) PCT No.: PCT/JP2013/084669
§ 371 (c)(1),
(2) Date: Jun. 25, 2015

(87) PCT Pub. No.: WO2014/104096
PCT Pub. Date: Jul. 3, 2014

(65) Prior Publication Data
US 2015/0353154 A1      Dec. 10, 2015

(30) Foreign Application Priority Data

Dec. 28, 2012   (JP) ................................. 2012-287431
Dec. 28, 2012   (JP) ................................. 2012-287540
Dec. 28, 2012   (JP) ................................. 2012-287601

(51) Int. Cl.
*B23K 31/02*      (2006.01)
*B62D 65/02*      (2006.01)
*B23K 37/04*      (2006.01)
*B23K 37/02*      (2006.01)
*G01B 11/14*      (2006.01)
*B23P 21/00*      (2006.01)

(52) U.S. Cl.
CPC .............. *B62D 65/02* (2013.01); *B23K 31/02* (2013.01); *B23K 37/02* (2013.01); *B23K 37/04* (2013.01);
(Continued)

(58) Field of Classification Search
CPC .... B62D 65/02; B62D 65/026; B23K 37/047; B23K 2201/006; B23K 37/0443;
(Continued)

(56) References Cited

U.S. PATENT DOCUMENTS 4,538,044 A      8/1985   Kadowaki et al.
5,155,690 A     10/1992   Nomaru et al.
(Continued)

FOREIGN PATENT DOCUMENTS

JP          59-57264        4/1984
JP          02-018273       1/1990
(Continued)

OTHER PUBLICATIONS

Computer english translation JP 2011121436 A.*
(Continued)

*Primary Examiner* — Erin B Saad
(74) *Attorney, Agent, or Firm* — Rankin, Hill & Clark LLP

(57) ABSTRACT

A method for assembling a vehicle body wherein, first a floor and a side panel are positioned in the height direction thereof. Thereafter, the floor and the side panel are pressed without deforming the floor and the floor and the side panel are positioned. A roof is subsequently set on the upper section of the side panel and the front section and the rear section of the side panel and the front section and the rear section of the roof are positioned.

2 Claims, 16 Drawing Sheets

(52) U.S. Cl.
CPC .......... *B23P 21/002* (2013.01); *B62D 65/024* (2013.01); *B62D 65/026* (2013.01); *B62D 65/028* (2013.01); *G01B 11/14* (2013.01); *B23P 2700/50* (2013.01)

(58) Field of Classification Search
CPC .... B23K 37/02; B23K 37/0235; B23K 37/04; B23K 37/0435; B23K 3/087
USPC ................ 29/712, 559, 407.08, 407.09, 428; 228/6.1, 101, 175, 212, 213, 44.3, 47.1
See application file for complete search history.

(56) References Cited

U.S. PATENT DOCUMENTS 5,910,894 A * 6/1999 Pryor ............... G05B 19/41875
219/121.64

2005/0274699 A1* 12/2005 Lee ........................ B23K 11/11
219/117.1

FOREIGN PATENT DOCUMENTS

| | | |
|---|---|---|
| JP | 7-108674 | 11/1995 |
| JP | 7-1078674 | 11/1995 |
| JP | 2684685 | 12/1997 |
| JP | 2003-145361 | 5/2003 |
| JP | 3655137 | 6/2005 |
| JP | 2009-271021 | 11/2009 |
| JP | 2011-121436 | 6/2011 |

OTHER PUBLICATIONS

International Search Report, dated Apr. 8, 2014 (Apr. 8, 2014).
Chinese Office Action with Partial English Translation dated May 5, 2016, 6 pages.
Canadian Office Action dated May 18, 2016.

* cited by examiner

FIG.1
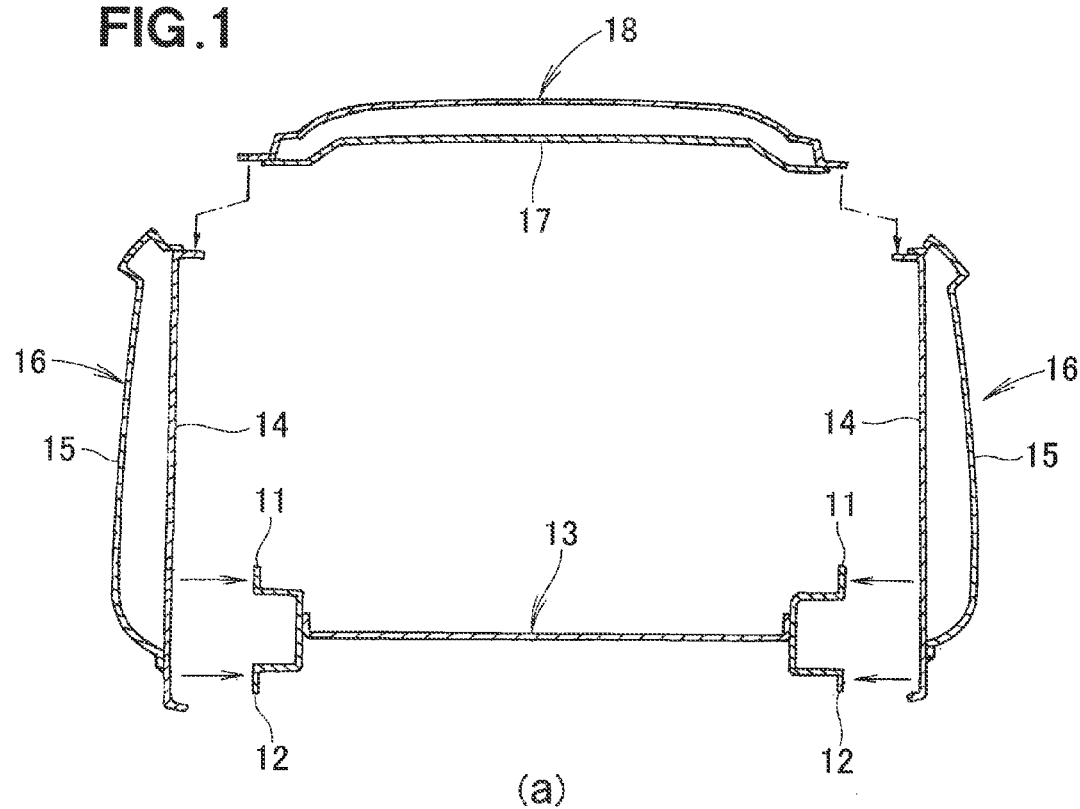
(a)
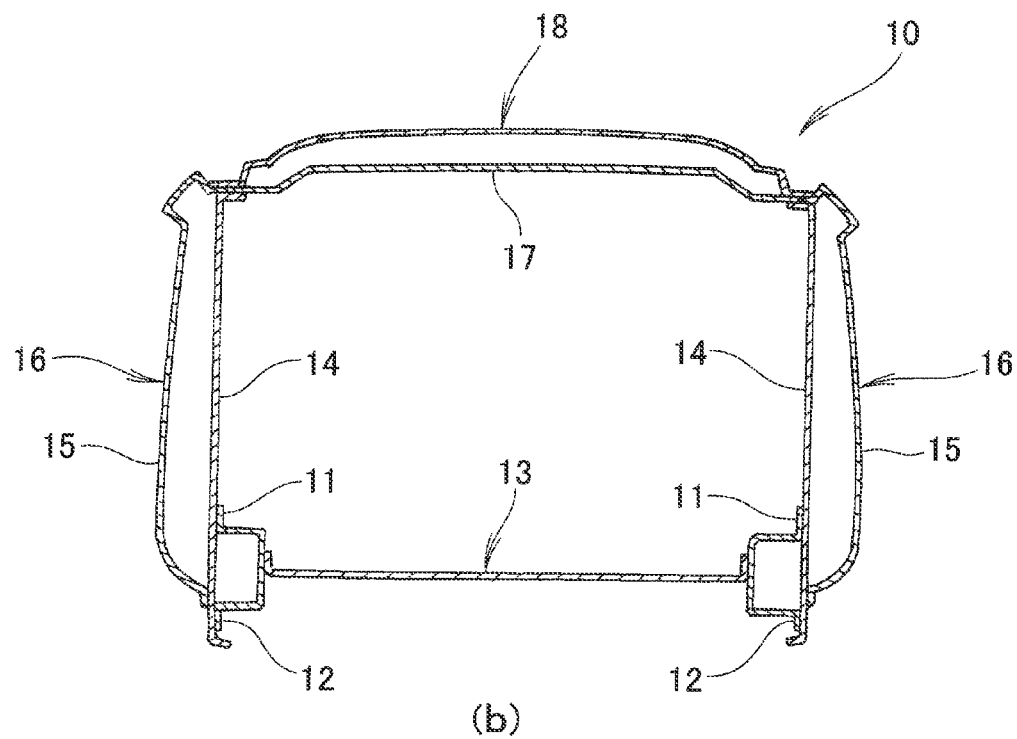
(b)

FIG.2
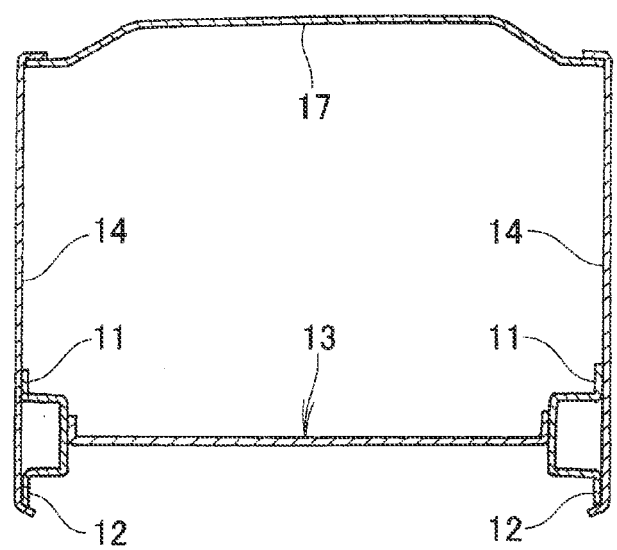
(a)
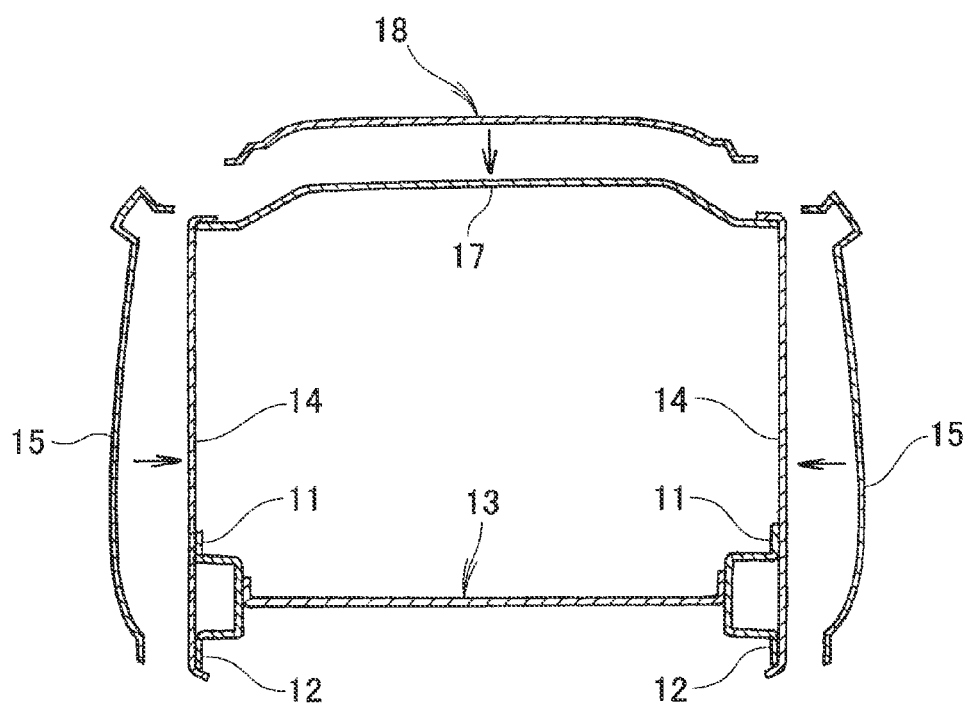
(b)

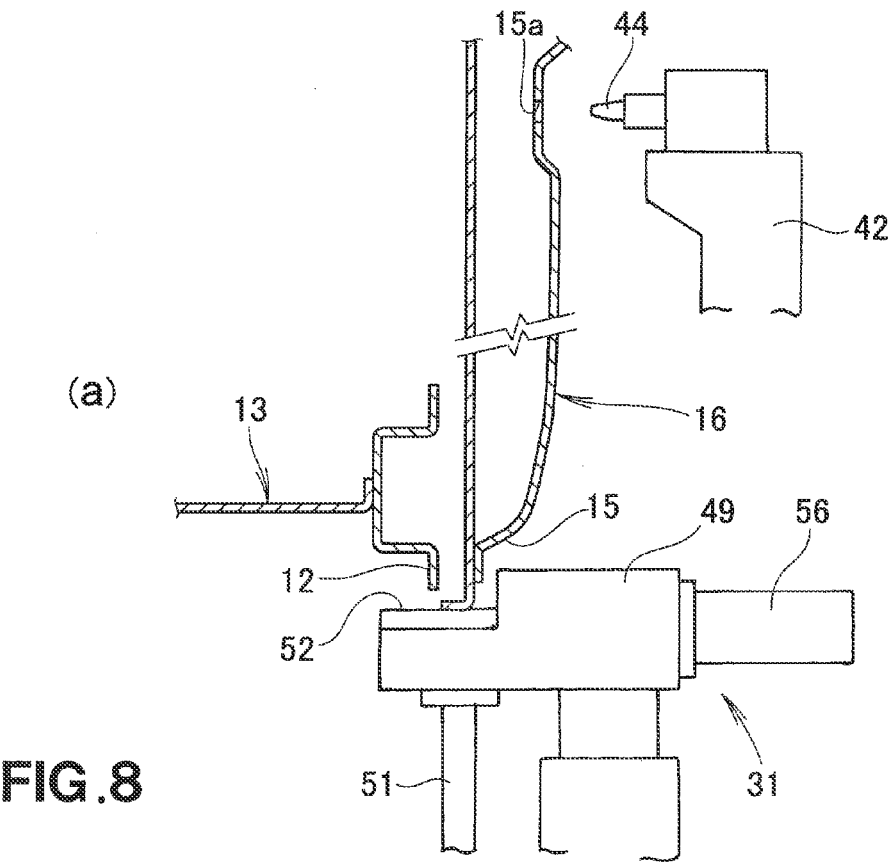
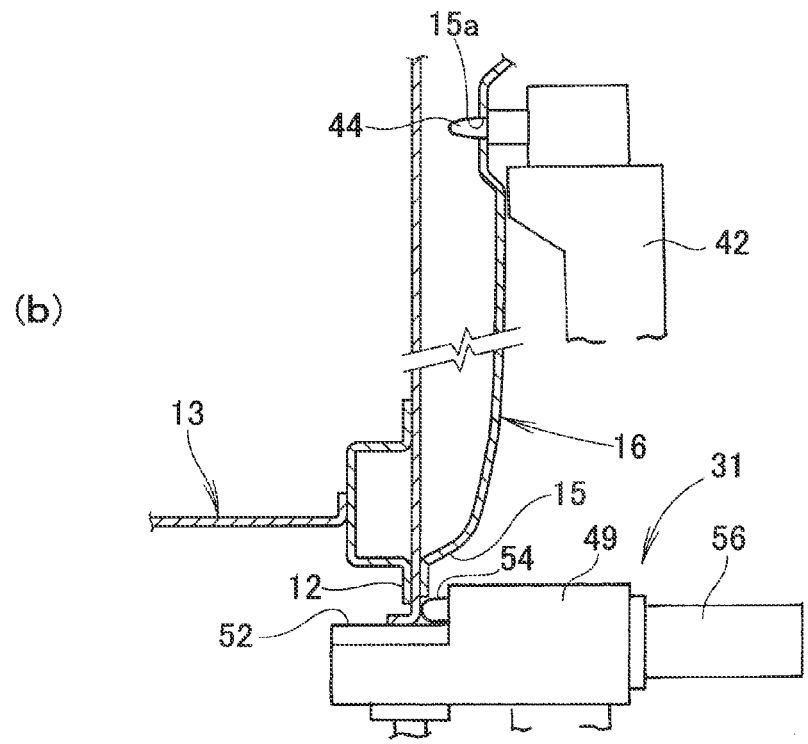
FIG.8

ASSEMBLY METHOD FOR VEHICLE BODY AND ASSEMBLY DEVICE FOR SAME

TECHNICAL FIELD

The present invention relates to a technique for assembling vehicle bodies.

BACKGROUND ART

A vehicle body is manufactured by at least welding a floor, side panels and a roof to one another. Recently, the vehicle body is automatically assembled using jigs and robots (see, e.g., patent literature 1 below).

The vehicle body disclosed in patent literature 1 is comprised of a floor, side panels, and a roof. Using setting jigs, the side panels are forcefully pressed against the floor to maintain a regular interval between the side panels. The roof is placed onto the side panels with the regular interval therebetween being maintained, and the floor, the side panels, and the roof are welded by welding robots.

Although the foregoing conventional assembling method is widely put in practical use, the method leaves room for improvements. Using the setting jigs to forcefully press the side panels against the floor to maintain the regular interval between the side panels is usually done. Under this condition, the welding is conducted. However, upon removal of the setting jig after the welding, the floor is released from the compressive deformed position. This results in vehicle bodies increasing their width dimension, including vehicles increasing their width dimensions within the tolerance. The degree of change in with dimension is different from vehicle body to vehicle body, which constitutes a factor for variation in width dimension among the vehicle bodies. Further, as for the welding with the compressive force applied to the floor, a stress remains upon elimination of the compressive force. This remaining stress becomes a factor for occurrence of distortion. There is a demand for an assembling technique which eliminates the factor for variation in dimension among the vehicle bodies and prevents or reduces the occurrence of distortion.

As disclosed in patent literature 1, furthermore, the setting jig carries the welding robot thereon, and thus is complicated and large-sized. Although a space for installation of the jig is defined on a lateral side of the vehicle body, such a space is limited and thus the setting jig needs to be simplified for installation in the limited space.

As disclosed in patent literature 1, furthermore, the roof hanging on a retainer attached to a travelling frame is conveyed to a predetermined location. The travelling frame is a steel grid-shaped frame having the overall length larger than that of the roof, and thus is heavy and large-sized. The welding robot is carried adjacent to this travelling frame. For this reason, the assembling station is large-sized and heavy. While there is a demand for reduction in size and weight of the assembling station, the reduction in size and weight of the travelling frame associated with the roof is required.

PRIOR ART LITERATURE

Patent Literature

Patent Literature 1: JP-A-2000-203472

SUMMARY OF INVENTION

Technical Problem

An object of the present invention is to provide an assembling technique which takes account of the foregoing points to be improved, i.e., eliminates the factor for variation in dimension among the vehicle bodies and prevents or reduces the occurrence of distortion.

Another object of the present invention is to provide an assembling apparatus which takes account of the foregoing points to be improved, i.e., achieves the reduction in size and weight of the travelling frame associated with the roof.

Yet another object of the present invention is to provide an assembling apparatus which takes account of the foregoing points to be improved, i.e., achieves the simplification of the setting jig associated with the side panel.

Solution to Problem

According to a first aspect of the present invention, as defined in claim 1, there is provided a method for assembling a vehicle body by at least welding a floor, side panels, and a roof to one another, the method comprising: a floor and side panel positioning step of positioning the floor and the side panels in a height direction, and subsequently pressing the side panels and the floor to such a degree as not to deform the floor; and a side panel and roof positioning step following the floor and side panel positioning step, the side panel and roof positioning step being a step of setting the roof on upper parts of both of the side panels to position a front part of the roof and front parts of the side panels while positioning a rear part of the roof and rear parts of the side panels.

According to a second aspect of the present invention, there is provided a method for assembling a vehicle body by at least welding a floor, side panels, and a roof to one another, the method comprising: a floor positioning step of positioning the floor; a side panel conveyance step of causing a side panel conveyance robot to move the side panel to a vicinity of the floor; a height position determination step of determining a height position of the side panel by moving the side panel onto a level reference surface; a side panel abutment step of causing a side panel pushing mechanism to bring the side panel into abutment on the floor, the side panel pushing mechanism being configured to push the side panel horizontally with a force not deforming the floor; a first robot returning step of returning the side panel conveyance robot to a waiting position; a first welding start step of causing a welding gun to start welding the floor and the side panel together; a roof conveyance step of causing a roof conveyance robot to move the roof to a vicinity of the side panel; a roof setting step of causing a clamp mechanism to clamp or press the roof against the side panel; a second robot returning step of returning the roof conveyance robot to a waiting position; and a second welding start step of causing the welding gun to start welding the side panel and the roof together.

Preferably, the method further comprises a roof set state confirmation step of confirming that the roof is set in a predetermined position relative to the side panel, between the roof setting step and the second welding start step.

According to a third aspect of the present invention, there is provided a vehicle body assembling apparatus for assembling a vehicle body by at least welding a floor, side panels, and a roof to one another, the apparatus comprising: a base disposed centrally of the apparatus for bearing a carriage to determine a three-dimensional position of the carriage, the carriage carrying the floor thereon; a level reference surface disposed on each lateral sides of the base to set a height of the side panel; a side panel pushing mechanism disposed on each lateral side of the base for pushing the side panel horizontally with a force not deforming the floor; a side panel conveyance robot for conveying the side panel, a roof conveyance robot for conveying the roof, and a welding robot including a welding gun, the side panel conveyance robot, the roof conveyance robot and the welding robot being disposed around the base; and a clamp mechanism for clamping or pressing the roof against the side panel.

According to a fourth aspect of the present invention, there is provided a vehicle body assembly apparatus for assembling a vehicle body by at least welding a floor, side panels, and a roof to one another, the apparatus comprising a clamp mechanism for clamping or pressing the roof against the side panel, the clamp mechanism comprising: a front clamp jig corresponding to a front part of the roof, the front part not including a longitudinal middle of the roof; a rear clamp jig corresponding to a rear part of the roof, the rear part not including the longitudinal middle of the roof; and a clamp mechanism state confirmation mechanism for confirming if a relative posture between the front clamp jig and the rear clamp jig is correct.

Preferably, the clamp mechanism state confirmation mechanism comprises a laser beam emitting part provided at one of the front clamp jig and the rear clamp jig, and a laser beam receiving part provided at the other of the front clamp jig and the rear clamp jig, and when a laser beam emitted from the laser beam emitting part is received by the laser beam receiving part, the relative posture is judged to be normal, and when the laser beam is not received by the laser beam receiving part, the relative posture is judged to be not normal.

Preferably, the apparatus further comprises a jig connecting mechanism on a side of the ground, and a connecting tool provided on each of the front clamp mechanism and the rear clamp mechanism for connection to the jig connecting mechanism.

According to a fifth aspect of the present invention, there is provided a vehicle body assembling apparatus for assembling a vehicle body by at least welding a floor and side panels with the side panels placed on the floor, the apparatus comprising: a level reference surface for determining a height position of the side panel; first pressing means for pushing toward the floor a lower side of the side panel placed on the level reference surface; and second pressing means for pushing a portion of the side panel toward the floor, the portion of the side panel being different from the lower side.

Preferably, the first pressing means has a pushing force set to such a degree as not to deform the floor, and the second pressing means has a pushing force set to such a degree as not to deform the floor.

Preferably, the first pressing means and the second pressing means are mounted to be movable in a longitudinal direction of the vehicle body.

Advantageous Effects of Invention

Regarding the invention defined in claim 1, after the floor and the side panels are positioned, the side panels and the roof are positioned. In this case, there is no concern about deformation of the vehicle body after the welding. Because of no deformation of the vehicle body, a positional accuracy of the body of an automobile based on the roof can be improved.

Regarding the invention defined in claim 2, in the side panel abutment step, the panel is slightly pressed against the floor. That is, because their flanges are brought into close contact with each other and welded together by the welding gun, particularly, a spot welding gun after the side panel abutment step, the side panel is slightly pressed against the floor to such a degree as not to cause a substantive resilience in the side panel abutment step. As a result, no change in width dimension of the vehicle body occurs due to a compressive deformation. Because of no compressive deformation, occurrence of distortion can be reduced or prevented. Therefore, according to the present invention, an assembling technique which eliminates the factor for variation in vehicle body dimension and reduces or prevents the occurrence of the distortion can be achieved.

Regarding the invention defined in claim 3, there is provided the roof set state confirmation step of confirming that the roof is set in the predetermined position relative to the side panel. When the roof is not set in the predetermined position, an alarm can issue and the assembling process can be interrupted. Thus, the assembled vehicle body maintains its reliability.

Regarding the invention defined in claim 4, the side panel pushing mechanism slightly presses the side panel against the floor. That is, because their flanges are brought into close contact with each other and welded together by the welding gun after the side panel abutment step, the side panel is slightly pressed against the floor to such a degree as not to cause a substantive resilience in the side panel abutment step. As a result, no change in width dimension of the vehicle body occurs due to a compressive deformation. Because of no compressive deformation, occurrence of distortion can be reduced or prevented.

Additionally, the side panel pushing mechanism does not carry the welding gun thereon, and thus is simple. That is, simplification of, and reduction in size and weight of the side panel pushing mechanism can be achieved. Similarly, the clamp mechanism does not carry the welding gun thereon and thus is simple. That is, simplification of, and reduction in size and weight of the clamp mechanism can be achieved.

Regarding the invention defined in claim 5, the clamp mechanism is constituted by the front clamp jig and the rear clamp jig. Since the clamp mechanism has no large portion corresponding to an intermediate part of the roof, the reduction in size and weight of the clamp mechanism can be achieved. Problems which would result from the separation of the front clamp jig and the rear clamp jig from each other are resolved by the clamp mechanism state confirmation mechanism. Thus, there is no concern about occurrence of such problems.

Regarding the invention defined in claim 6, the clamp mechanism state confirmation mechanism comprises the laser beam emitting part provided at the one of the front clamp jig and the rear clamp jig, and the laser beam receiving part provided at the other of the front clamp jig and the rear clamp jig. Since a laser beam has a high tendency to travel straight, the laser beam emitting part and the laser beam receiving part can be disposed far away from each other. As a result, the intermediate part of the roof can be large-scaled, and the further reduction in weight and size of the clamp mechanism can be achieved.

Regarding the invention defined in claim 7, the jig connecting mechanism is provided on the side of the ground, and the connecting tool is provided on each of the front clamp jig and the rear clamp jig for connection to the jig connecting mechanism. The connection of the clamp-connecting tool on each clamp jig to the jig connecting mechanism nearly finishes the positioning of each of the front and rear clamp jigs to thereby greatly reduce the possibility that the clamp mechanism state confirmation mechanism makes a negative judgment. This results in the efficiency of the assembling work being enhanced.

Regarding the invention defined in claim 8, the assembling apparatus includes the first pressing means and the second pressing means. Conventionally, setting jigs carry welding robots thereon and thus are large-sized and complicated. In contrast, according to the present invention, the welding robot can be separated from the first and second pressing means which may correspond to the conventional setting jigs. Thus, simplification of the first and second pressing means which may correspond to the conventional setting jigs can be achieved.

Regarding the invention defined in claim 9, the first pressing means has the pushing force set to such a degree as not to deform the floor, and the second pressing means has the pushing force set to such a degree as not to deform the floor. No change in width dimension of the vehicle body occurs due to a compressive deformation. Because of no compressive deformation, occurrence of distortion can be reduced or prevented. Therefore, according to the present invention, an assembling technique which eliminates the factor for variation in vehicle body dimension and reduces or prevents the occurrence of the distortion can be achieved.

Regarding the invention defined in claim 10, the first pressing means and the second pressing means are mounted to be movable in the longitudinal direction of the vehicle body. This makes it possible to assemble many kinds of side panels of different sizes. As a result, the vehicle assembling apparatus can have the high value added.

BRIEF DESCRIPTION OF DRAWINGS

FIG. 1 is a cross-sectional view of a vehicle body;

FIG. 2 is a cross-sectional view of a vehicle body called an inner skeleton;

FIG. 8 is a view showing a function of the level reference surface;

DESCRIPTION OF EMBODIMENT

Figure 3:
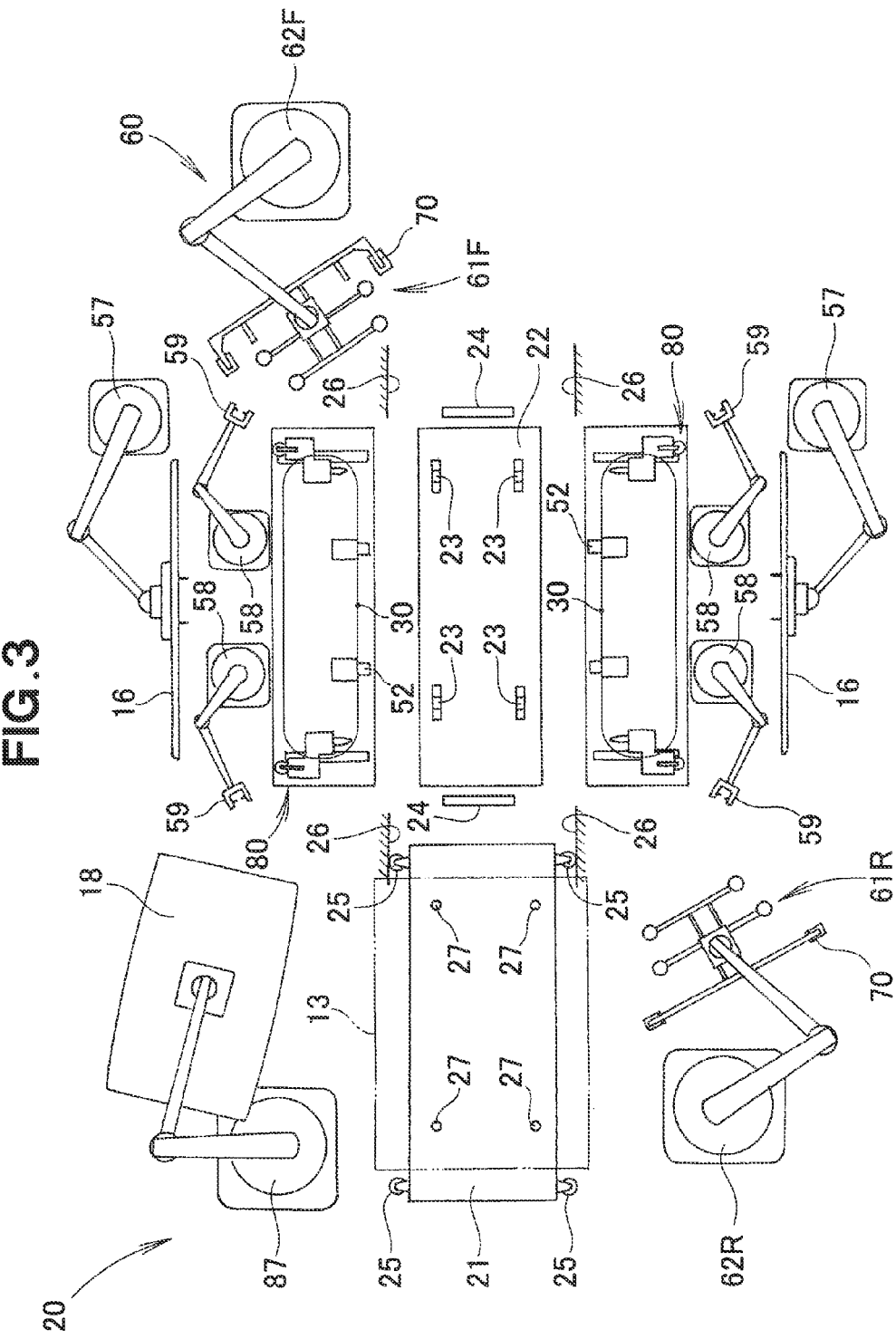
FIG. 3 is a plan view of a vehicle body assembling apparatus according to the present invention.

A certain preferred embodiment of the present invention is described below with reference to the accompanying drawings.

Embodiment

A vehicle body may be assembled in at least two different manners in accordance with the present invention. These two manners are discussed below. As shown in FIG. 1(a), a floor 13 having upper and lower flanges 11, 12 at one end, and upper and lower flanges 11, 12 at an opposite end is provided. Side panels 16 each defined by an inner panel 14 and an outer panel 15 are provided. A roof 18 including a roof arch 17 is provided.

Next, a lower part of the side panel 16 is brought into abutment on and welded to the upper and lower flanges 11, 12. Then, the roof 18 is placed onto and welded to upper parts of the side panels 16. As a result, a vehicle body 10 shown in FIG. 1(b) is completed.

In a state shown in shown in FIG. 1(a), the side panels 16 and the roof 18 have increased rigidities, such that there is no need for concern about deformation of the side panels 16 and the roof 18 as the side panels 16 and the roof 18 are conveyed by a conveyance robot. Thus, the conveyance robot can easily position the side panels and the roof.

Turning to FIG. 2(a) showing the other manner of assembling the vehicle body, a step of mounting the inner panels 14 to the floor 13 and mounting the roof arch 17 to the inner panels 14 is performed prior to a step of the present invention.

As shown in FIG. 2(b), an apparatus of the present invention mounts the outer panels 15, 15 and the roof 18. As a result, a vehicle body 10 having the same structure as that shown in FIG. 1(b) is completed.

The form shown in FIG. 2 is called an "inner skeleton", and the structure shown in FIG. 2(a) is assembled on a sub-assembly line. The structure of FIG. 2(a) has a side panel defined by the inner panel alone, and a roof defined by the roof arch 17 alone. Since the inner skeleton shares the same assembly equipment with the floor 13, and each "skin" (the roof 18 and the outer panel 15) shares the same assembly equipment with each "complex" (the assembly, the roof 17, 18 and the side panel 16), the assembling apparatus of the present invention can be used for the inner skeleton. That is, the present invention is applicable to the vehicle bodies of FIGS. 1 and 2.

A detailed discussion is made below as to a vehicle body assembling apparatus 20 and an assembling method according to the present invention.

Although the present invention is applicable to both of the skeletons shown in FIGS. 1 and 2, the discussion below is made as to the structure of FIG. 1 with reference to FIG. 3 and its subsequent figures.

As shown in FIG. 3, the vehicle body assembling apparatus 20 includes a base 22 disposed centrally thereof for bearing a carriage 21 to set a three-dimensional position of the carriage 21 with a floor 13 carried on the carriage 21. The floor 13 is shown by a phantom line. The apparatus 20 also includes level reference surfaces 52, 52 disposed on each side of the base 22 for setting heights of the side panels 16, 16. The apparatus 20 further includes side panel pushing mechanism 30, 30 disposed on opposite sides of the base 22 for pushing the side panels 16, 16 horizontally with forces not deforming the floor 13. The apparatus 20 further includes side panel conveyance robots 57, 57 for conveying the side panels 16, 16. The apparatus 20 further includes a roof conveyance robot 87 for conveying the roof 18, a welding robot 58 including a welding gun 59, and a clamp mechanism 60 for clamping or pressing the roof 18 against the side panels 16, 16. The side panel conveyance robots 57, 57, the roof conveyance robot 87, the welding robot 58, and the clamp mechanism 60 are disposed around the base 22.

The base 22 has, for example, a plurality of trapezoid-shaped leveling member 23 on a top surface thereof. The leveling members 23 determine a height position of the carriage 21 carried onto the leveling members 23.

Additionally, for example, positioning members 24, 24 which can be raised and lowered are disposed forwardly and rearwardly of the base 22. These positioning members 24, 24 sandwich the carriage 21 therebetween to position the carriage 21 in a longitudinal direction of the carriage 21.

The carriage 21 includes, for example, positioning rollers 25. Vertical positioning surfaces 26 are provided to or near the base 22 such that the positioning rollers 25 are located on the positioning surfaces 26 to position the carriage 21 in a widthwise direction of the carriage 21.

The floor 13 is supported by four rocket pins 27. The rocket pins 27 provide locations in height, longitudinal and widthwise directions of the carriage to determine a location of the floor 13 in height, longitudinal and widthwise directions of the floor 13. That is, the placement of the carriage 21 on the base 22 determines a three-dimensional position of the carriage 21 to thereby determine a three-dimensional position of the carriage 21.

The clamp mechanism 60 is comprised of a front spider clamp jig 61F (the letter "F" used herein is a suffix representing the front), a front jig robot 62F carrying the clamp jig 61F, a rear spider clamp jig 61R (the letter "R" used herein is a suffix representing the rear), and a rear jig robot 62R carrying the clamp jig 61R. Their detailed discussion is made later.

A detailed discussion is made below as to the primary mechanisms of the apparatus 20.

Figure 4:
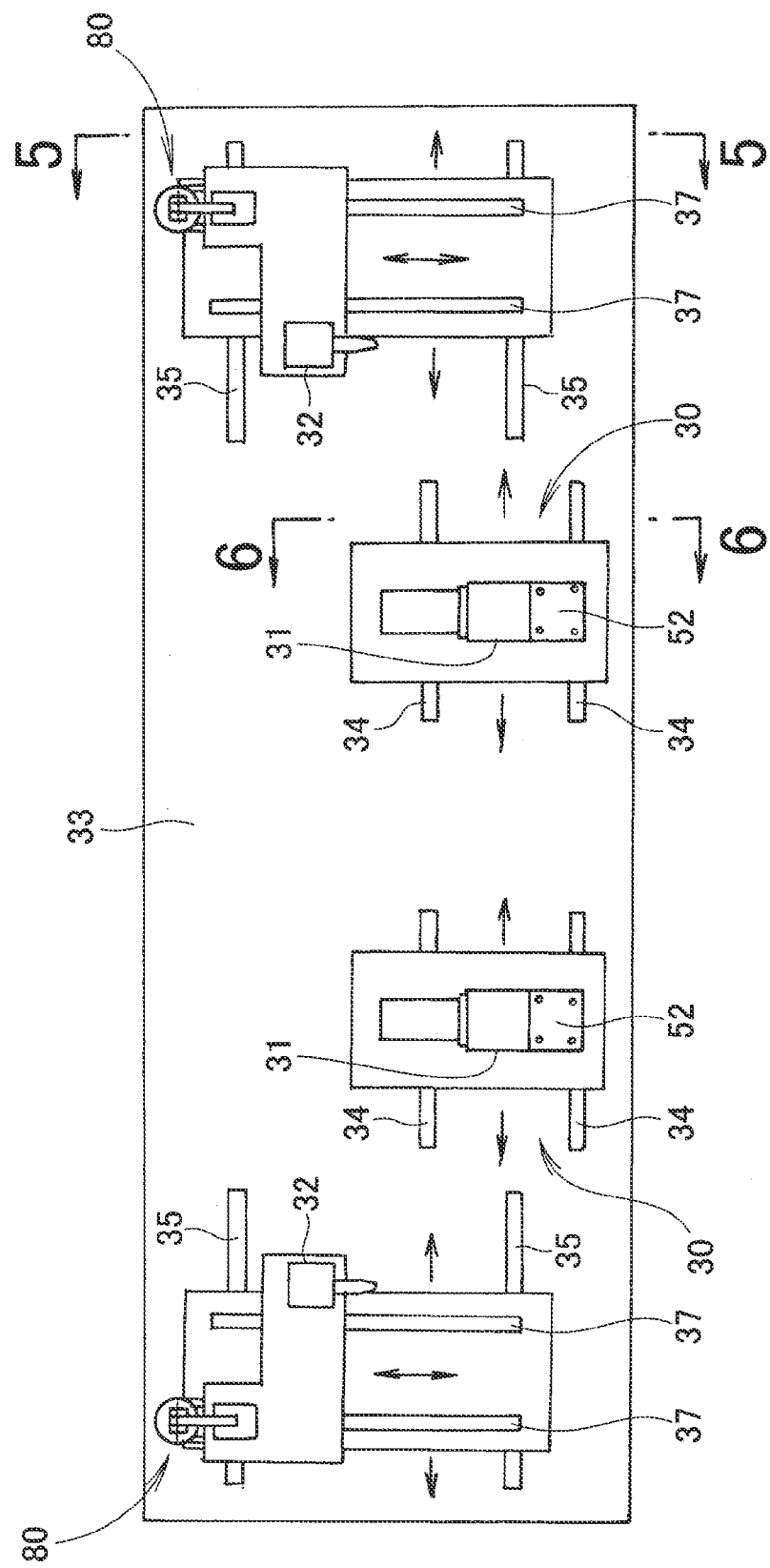
FIG. 4 is a plan view of a side panel pushing mechanism and a level reference surface.

As shown in FIG. 4, the side panel pushing mechanism 30 is comprised of a first pressing means 31 for slightly pushing the side panel, and a second pressing means 32 for slightly pushing the side panel.

Rails 34, 34, 35, 35 extending in a longitudinal direction of the vehicle body lie on a bed 33. The first pressing means 31 is movable on the rails 34, 34. The second pressing means 32 is movable on the rails 35, 35. To conform to different sizes of vehicle bodies, the first and second pressing means 31, 31, 32, 32 have their adjustable locations in the longitudinal direction of the vehicle body.

Figure 5:
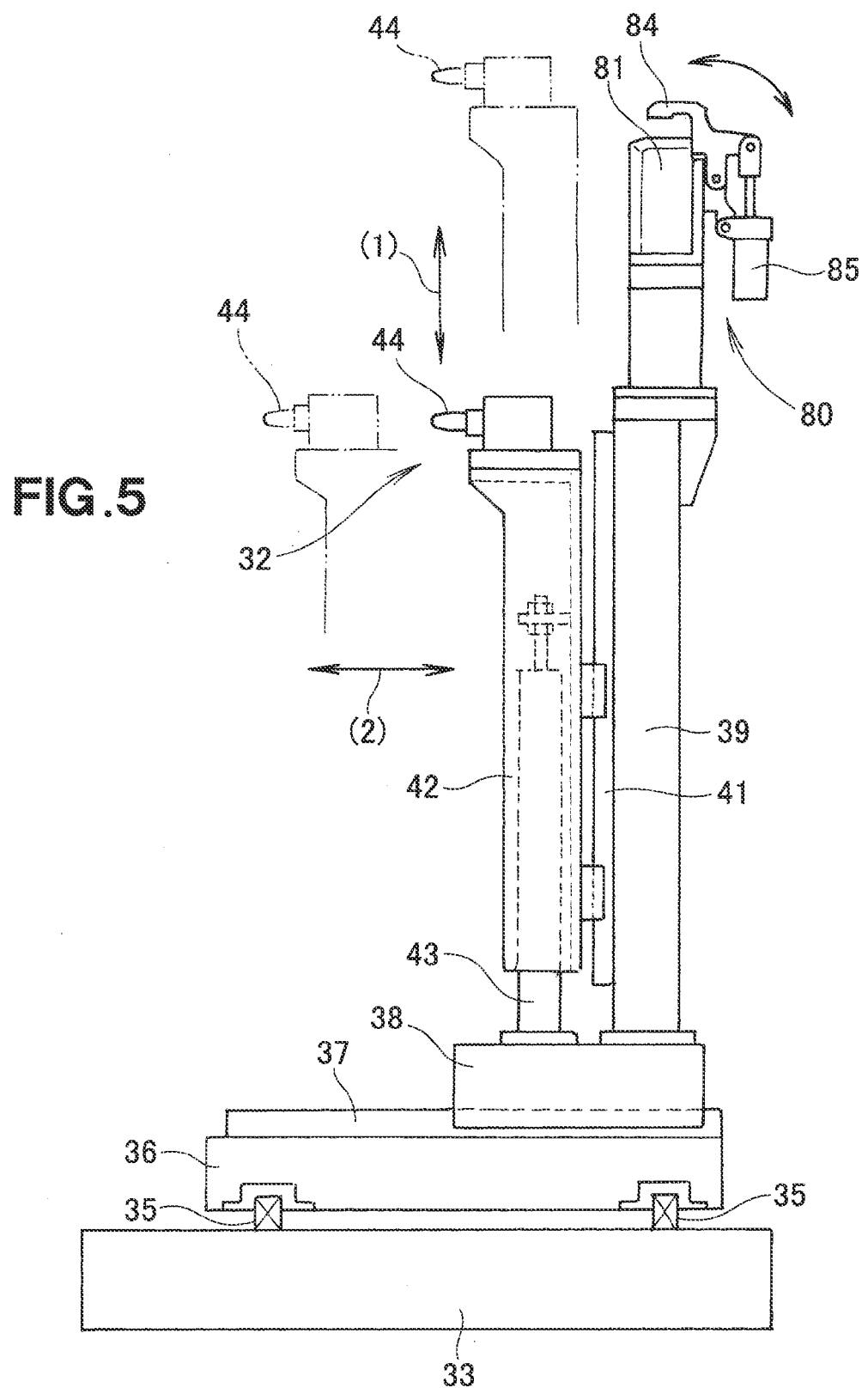
FIG. 5 is a cross-sectional view taken along line 5-5 of FIG. 4.

As shown in FIG. 5, the rails 35, 35 extending in a direction orthogonal to the sheet of FIG. 5 (in the longitudinal direction of the vehicle body) lie on the bed 33. A first slider 36 is carried on the rails 35, 35. Rails 37, 37 extending in a left-right direction of the sheet of FIG. 5 (in a widthwise direction of the vehicle) lie on the first slider 36. A second slider 38 is carried on the rails 37, 37. A support post 39 extends upwardly from the second slider 38. A vertical rail 41 is provided on the support post 39. A third slider 42 is mounted on the vertical rail 41. A cylinder unit 43 is provided for raising and lowering the third slider 42. A rocket pin 44, which is a primary element of the second pressing means 32, is mounted to a top of the third slider 42.

The rocket pin 44 has its height adjustable, as indicated by an arrow (1), in correspondence to the side panel to be handled. The rocket pin 44 can advance to push the side panel, as indicated by an arrow (2).

A jig connecting mechanism 80 is provided on a top end of the support post 39. A detailed discussion as to the jig connecting mechanism 80 is made later.

Figure 6:
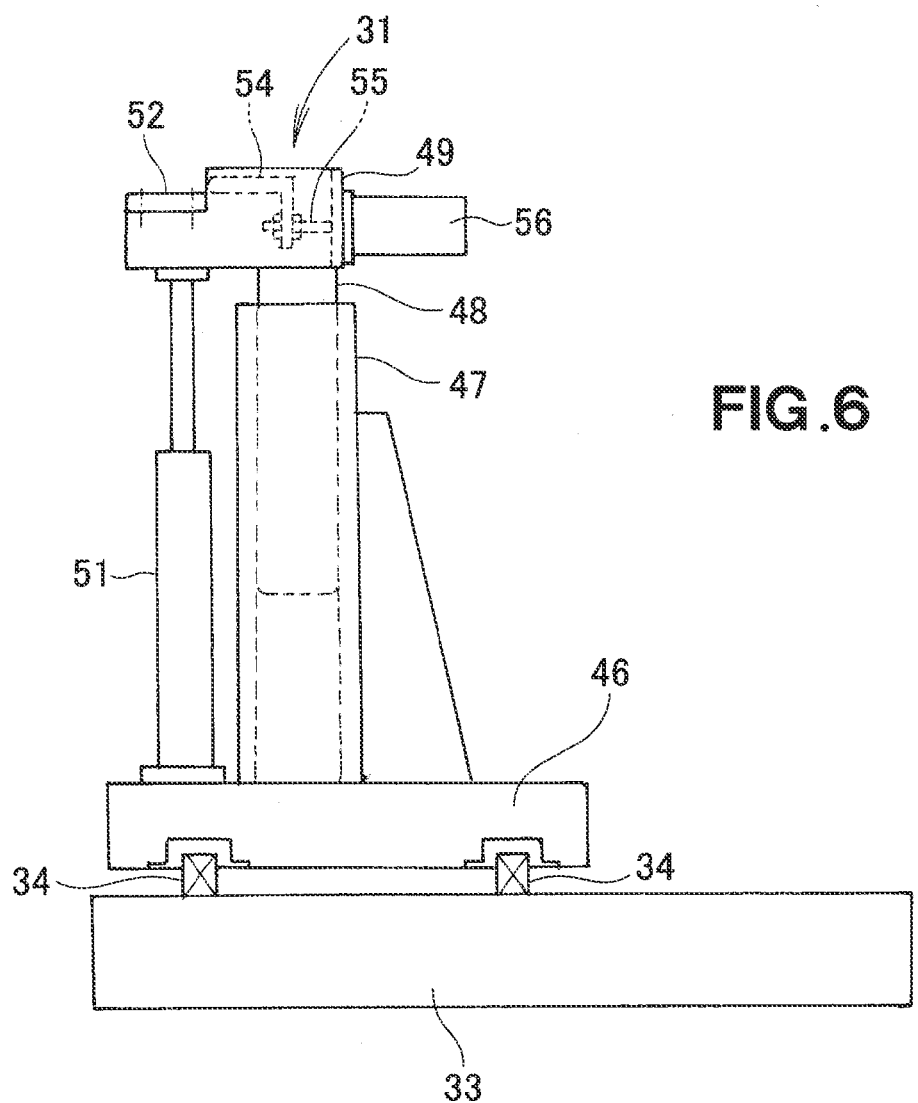
FIG. 6 is a cross-sectional view taken along line 6-6 of FIG. 4.

As shown in FIG. 6, the rails 34, 34 extending in a direction orthogonal to the sheet of FIG. 6 (in the longitudinal direction of the vehicle body) lie on the bed 33. A fourth slider 46 is carried on the rails 34, 34. A hollow support post 47 extends upwardly from the fourth slider 46. A leg member 48 fits in the hollow support post 47 such that the leg member 48 is raised and lowered. A mechanism block 49 is mounted on a top end of the leg member 48. The mechanism block 49 can be raised and lowered by a cylinder unit 51.

Figure 7:
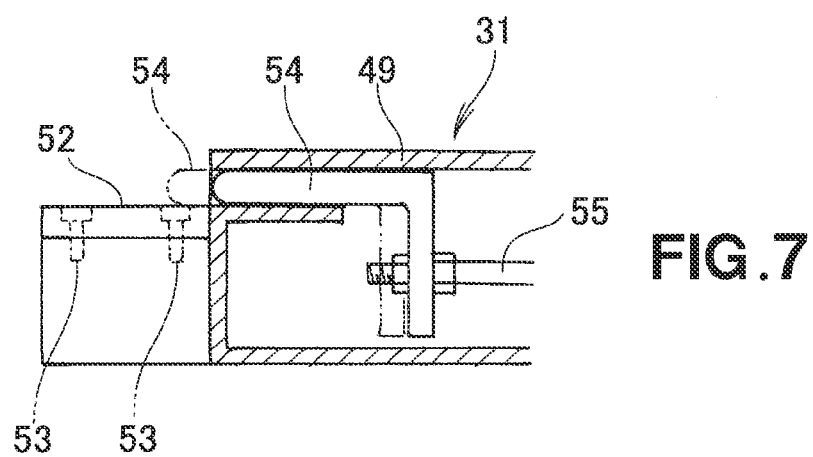
FIG. 7 is a cross-sectional view of a first pressing means shown in FIG. 6.

As shown in FIG. 7, the level reference surface 52 is fixed to a front portion of the mechanism block 49 by screws 53, 53. A side panel pushing piece 54 is incorporated in the mechanism block 49 such that the side panel pushing piece 54 can move horizontally on the level reference surface 52. The side panel pushing piece 54 is connected to a piston rod 55, and a pressing cylinder 56 including the piston rod 55 is secured to the mechanism block 49, as shown in FIG. 6.

Next, a discussion is made as to the level reference surface 52, the first pressing means 31 and the second pressing means 32. In FIG. 6, the cylinder unit 51 moves the level reference surface 52 to a predetermined height (level).

As a result, the level reference surface 52 is retained immediately below the lower flange 12, as shown in FIG. 8(*a*). Then, the side panel conveyance robot conveys the side panel 16 to move (place) a lower end of the side panel 16 onto the level reference surface 52.

The outer panel 15 has a hole 15a formed through a portion thereof which is to be subsequently covered by a door or a bumper. The hole 15a is a through-hole for a harness. The rocket pin 44 is set to face the hole 15a.

Next, as shown in FIG. 8(*b*), the rocket pin 44 advances into insertion through the hole 15a while the side panel pushing piece 54 advances. As a result, the side panel 16 slides forwardly on the level reference surface 52 to come into abutment on the lower flange 12. Since the side panel pushing mechanism is adjusted to push the side panel 16 to such a degree as not to deform the floor 13, the floor 13 does not deform (except for slight deformation) when the floor is in a situation shown in FIG. 8(*b*).

The side panel 16 is thus positioned relative to the floor 13. Since the side panel conveyance robots 57, 57 shown in FIG. 3 finish their roles, the robots 57, 57 are returned to waiting positions. Instead, the welding robot 58 in a waiting position is actuated to start welding the floor 13 and the side panel 16 together by the welding gun 59.

In a state shown in FIG. 8(*b*), the welding is performed. That is, the outer panel 15 is slightly pressed by the side panel pushing piece 54 against the lower flange 12 such that the floor 13 and the side panel 16 are welded together without substantive deformation of the floor 13. No change in width dimension of the vehicle body occurs due to a compressive deformation of the vehicle body. Since the compressive compression does not occur, little or no distortion can occur.

Figure 9:
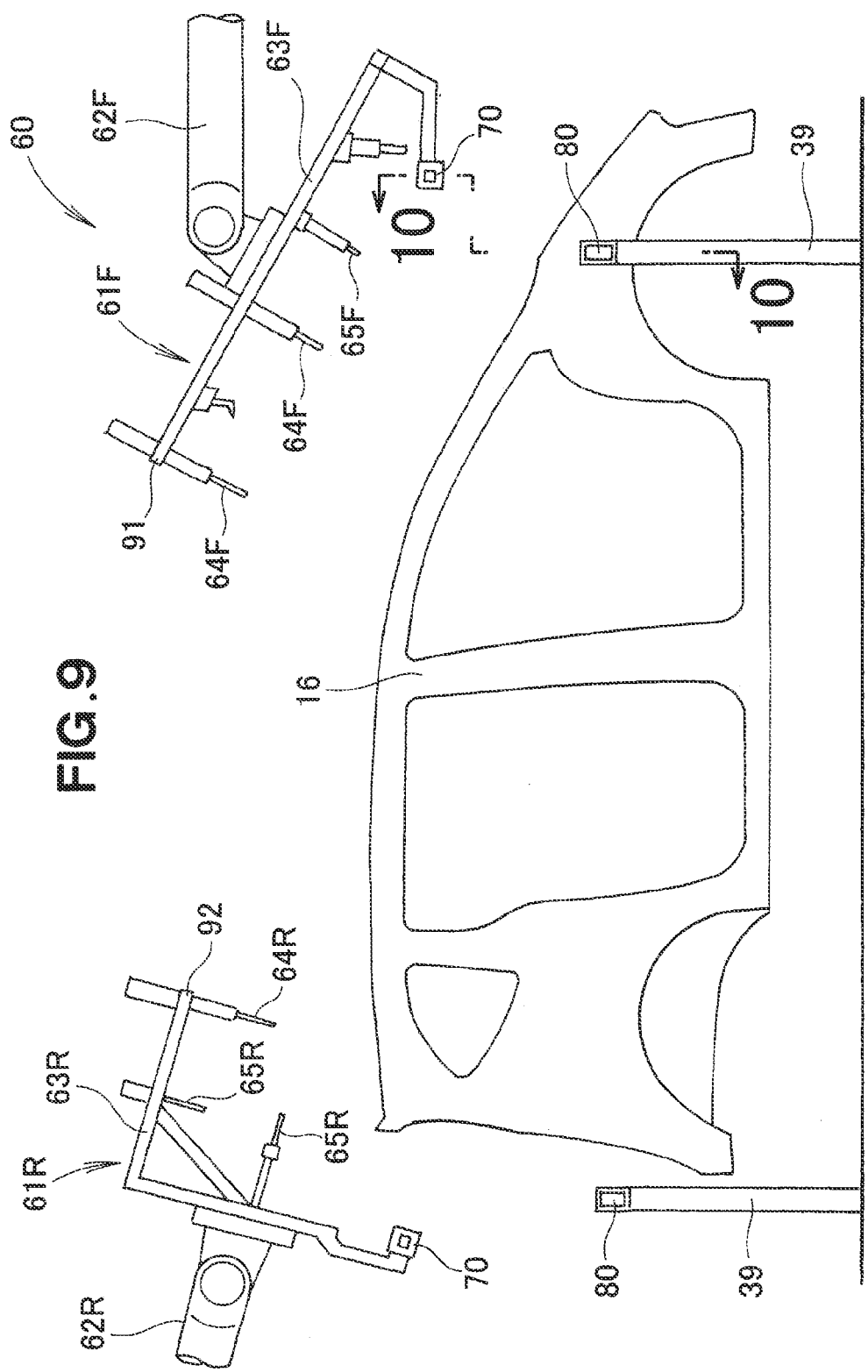
FIG. 9 is a side elevation view of a clamp mechanism.

As shown in FIG. 9, the clamp mechanism 60 is comprised of the front spider clamp jig 61F, and the rear spider clamp jig 61R. The front spider clamp jig 61F is in a waiting position located forwardly of the side panel 16 while the rear clamp jig 61R is in a waiting position located rearwardly of the side panel 16.

The front spider clamp jig 61F includes a hook-shaped frame 63F connected to the front jig robot 62F, a pulling metal part 64F, and a pressing metal part 65F. The metal parts 64F, 65F are appropriately provided on the frame 63F. The frame 63F has a laser beam emitting part 91 at an upper portion thereof. Also, the frame 63F has a connecting tool 70 at a lower portion thereof.

The rear spider clamp jig 61R includes a hook-shaped frame 63R connected to the rear jig robot 62R, a pulling metal part 64R, and a pressing metal part 65R. The metal parts 64R, 65R are appropriately provided on the frame 63R. The frame 63R has a laser beam receiving part 92 at an upper portion thereof. Also, the frame 63R has a connecting tool 70 at a lower portion thereof.

Figure 10:
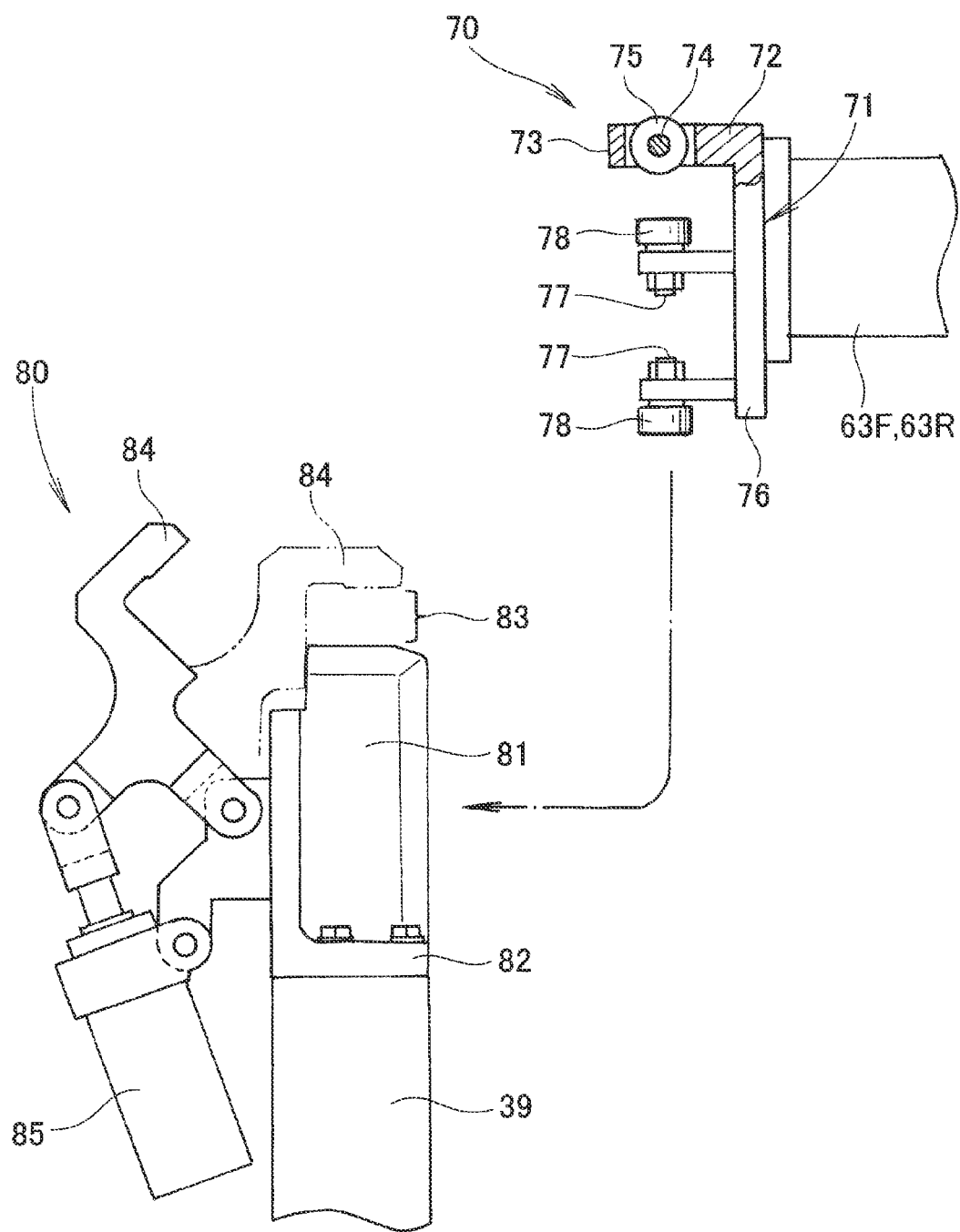
FIG. 10 is a cross-sectional view taken along line 10-10 of FIG. 9.

As shown in FIG. 10, the connecting tool 70 is comprised of an L-shaped cross-sectional roll holder 71, a positioning end surface 73, a positioning roll 75, and guide rolls 78, 78. The positioning end surface 73 is provided at a distal end of an upper horizontal portion 72 of the roll holder 71. The positioning roll 75 is mounted on the roll holder 71 and rotatable on a horizontal shaft 74. The guide rolls 78, 78 are mounted to a lower vertical portion 76 of the roll holder 71 and rotatable on vertical shafts 77, 77.

The jig connecting mechanism 80 provided on the top end of the support post 39 is comprised of a bracket 82, a hook member 84, and a pivotal cylinder 85. The bracket 82 includes a positioning plate 81 extending vertically. The hook member 84 is pivotably mounted on the bracket 82 such that the hook member 84 pivots to a closed position forming a sandwiching space 83 for the positioning roll 75. The pivotal cylinder 85 causes a pivotal movement of the hook member 84.

Figure 11:
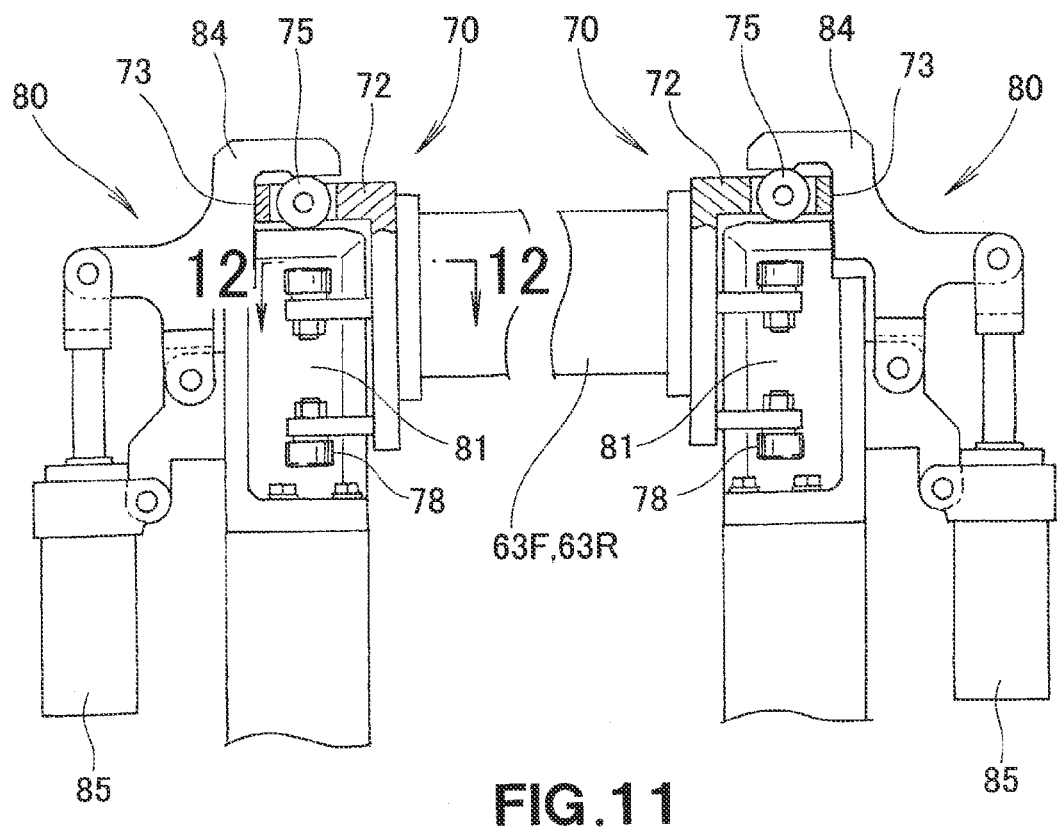
FIG. 11 is a view showing a function of a jig connecting mechanism.

When the connecting tool 70 is lowered with the hook member 84 held in a location shown by a solid line, the positioning roll 75 comes into a resting position on a top surface of the positioning plate 81. Afterward, the hook member 84 pivots to a location shown by a phantom line. This results in the positioning end surface 73 resting on the hook member 84, as shown in FIG. 11, to thereby position the connecting tool 70 in a widthwise direction of the vehicle (in a left-right direction of FIG. 11). Since the positioning roll 75 rests on the top surface of the positioning plate 81, a height position of the connecting tool 70 is determined.

Figure 12:
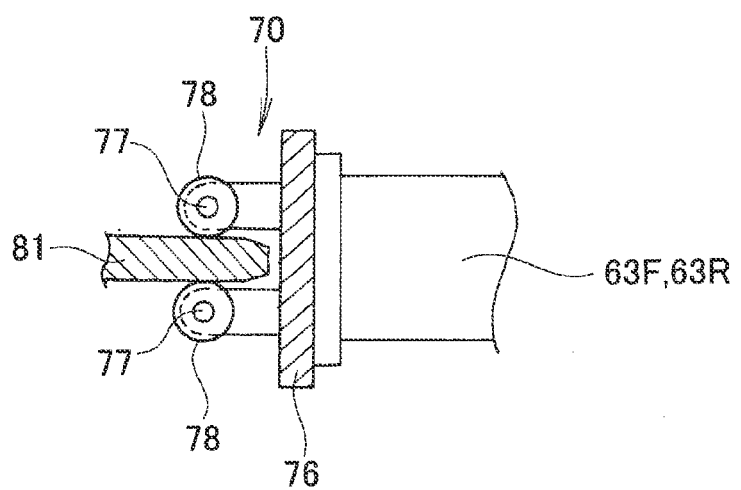
FIG. 12 is a cross-sectional view taken along line 12-12 of FIG. 11.

As shown in FIG. 12 which is a cross-sectional view taken along line 12-12 of FIG. 11, the positioning plate 81 is sandwiched between the guide rolls 78, 78. That is, the connecting tool 70 is positioned in a front-rear direction of the vehicle body. Namely, the front jig robot 62F lowers the front spider clamp jig 61F from the position (the waiting position) shown in FIG. 9 to connect the connecting tool 70 to the jig connecting mechanism 80 so as to determine a three-dimensional position of a lower end of the front spider clamp jig 61F. A lower end of the rear spider clamp jig 61R is positioned as with the lower end of the front spider clamp jig 61F.

Figure 13:
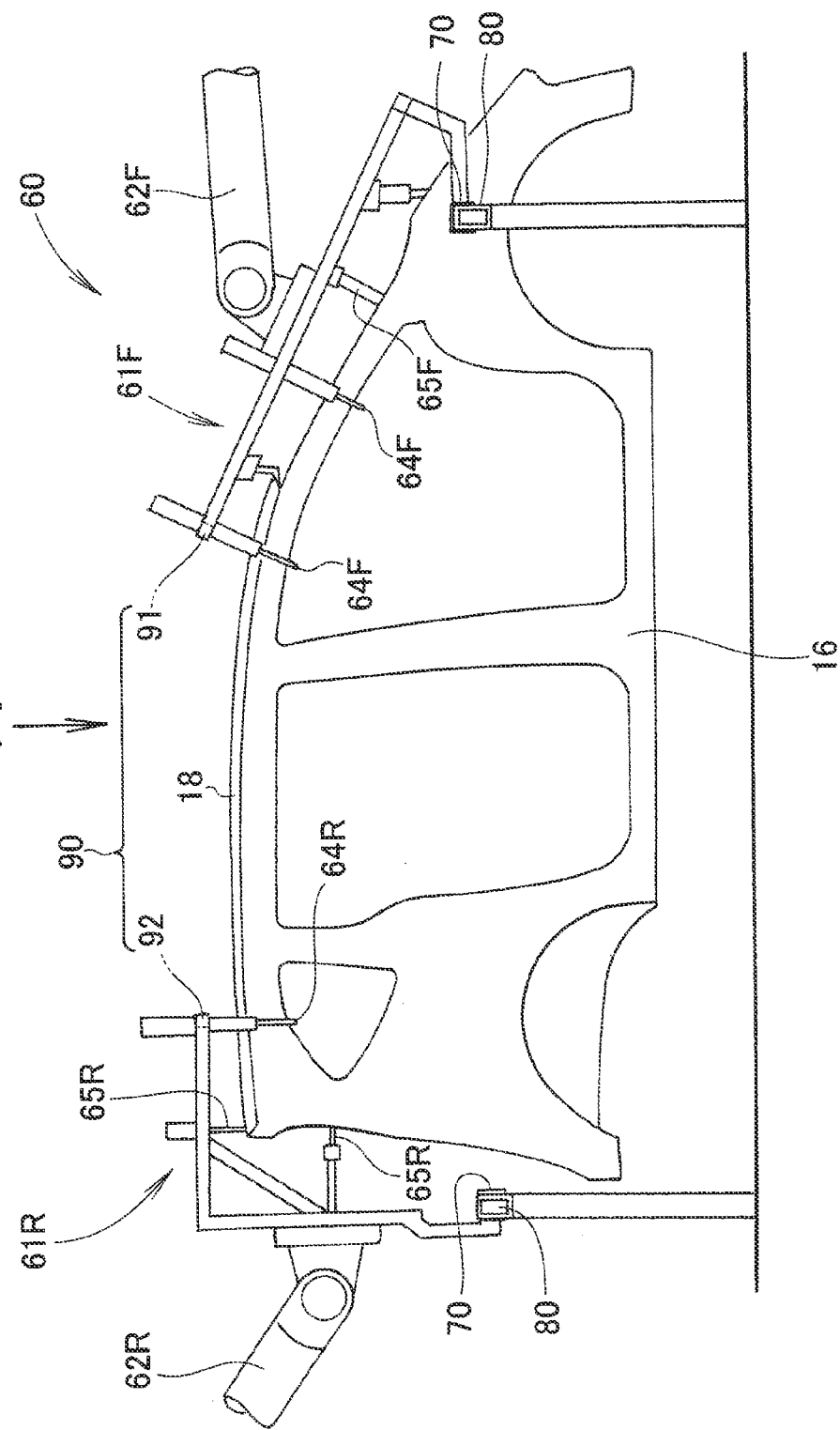
FIG. 13 is a view showing a function of the clamp mechanism.

The roof conveyance robot 87 shown in FIG. 3 conveys the roof 18 onto the base 22. More specifically, the roof 18 is conveyed onto an upper side of the previously positioned side panel 16, as shown in FIG. 13. The front spider clamp jig 61F is brought from the waiting position to a position along a front part of the roof 18 while the rear spider clamp jig 61R is brought from the waiting position to a position along a rear part of the roof 18. At this time, as discussed in relation to FIG. 11, the connecting tool 70 is connected to the jig connecting mechanism 80.

Thereafter, the front and rear spider clamp jigs 61F, 61R clamp or press the roof 18 against the side panel 16. In this state, the welding robot can perform welding.

Traditionally, a clamp mechanism has its length nearly equal to the length of the side panel 16. In contrast, the present invention divides the clamp mechanism into front and rear sections, eliminating a large middle section of the mechanism. As a result, each of the front and rear spider clamp jigs 61F, 61R has a smaller dimension in the longitudinal direction of the vehicle body. This enables the reduction in size and weight.

Figure 14:
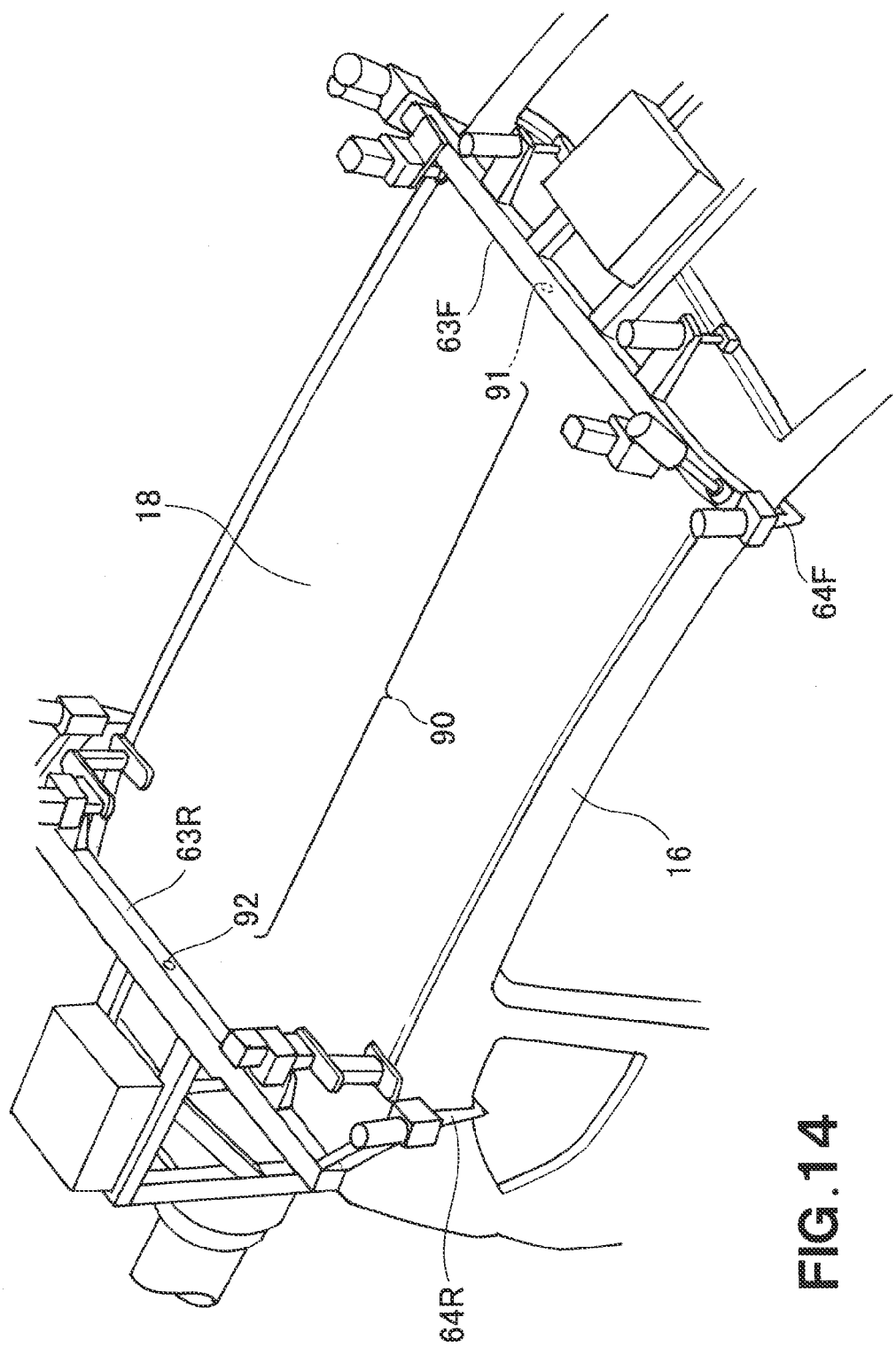
FIG. 14 is a view taken in a direction of an arrow 14 of FIG. 13.

Further, in the present invention, the laser beam emitting part 91 provided at an upper middle of the frame 63F of the front spider clamp jig and the laser beam receiving part 92 provided at an upper middle of the frame 63R of the rear spider clamp jig define a clamp mechanism state confirmation mechanism 90, as shown in FIG. 14. The laser beam emitting part 91 and the laser beam receiving part 92 may be located the other way around.

When it is confirmed that a laser beam enters the laser beam receiving part 92, it can be judged that an orientation of the rear spider clamp jig 61R relative to the front spider clamp jig 61F is correct. A distance between the laser beam emitting part 91 and the laser beam receiving part 92 may be measured by a laser beam such that the judgment is made based on the distance.

In FIG. 3, when the orientation of the rear spider clamp jig 61R relative to the front spider clamp jig 61F is judged to be correct, the roof conveyance robot 87 is returned to a waiting position and the welding robot starts welding the roof and the side panel together. When the orientation is not correct, the work is interrupted and an alarm issues, in which case measures are taken moving the vehicle body and the carriage together out of the line.

Figure 15:
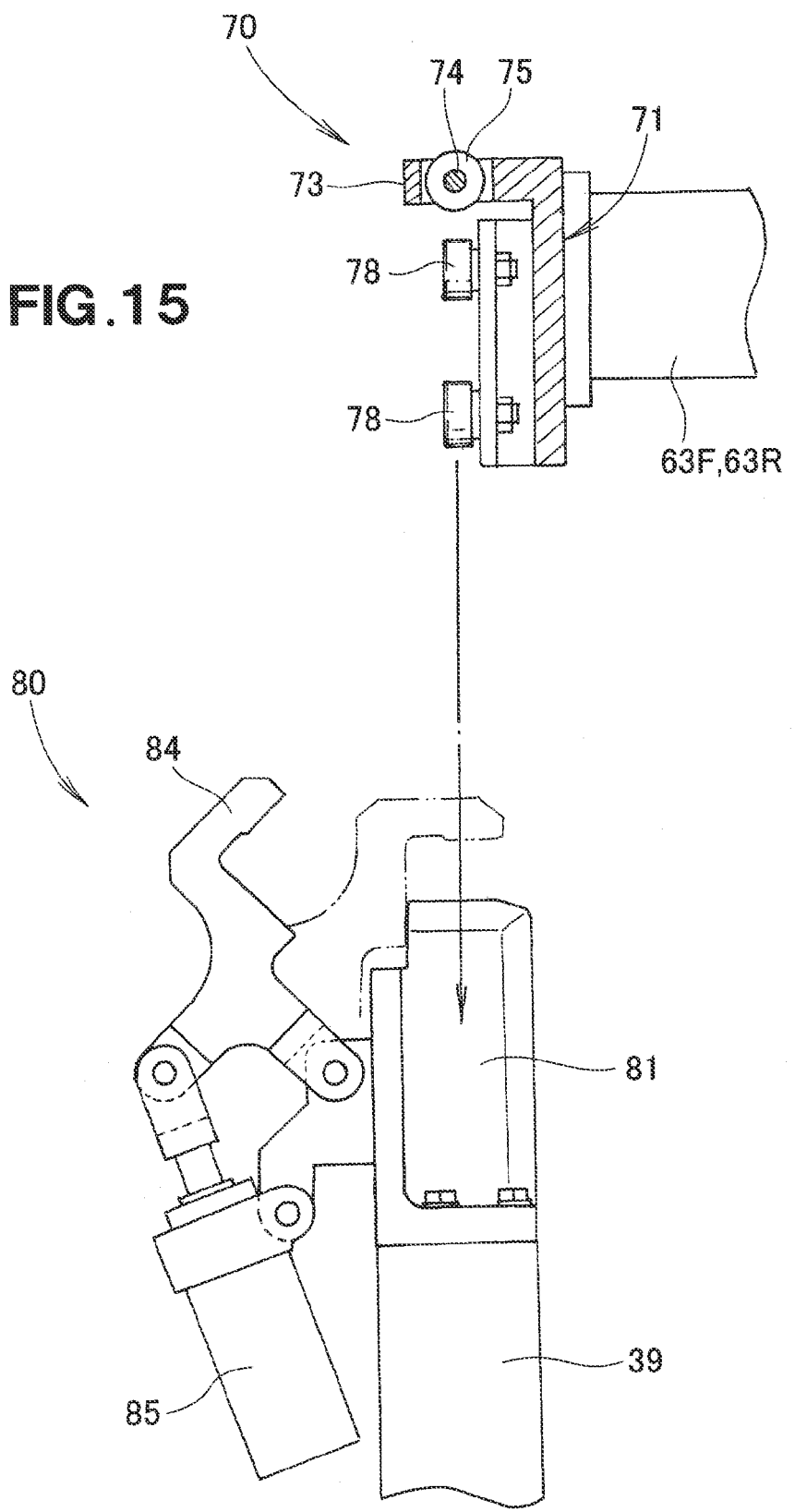
FIG. 15 is a view showing a modification to an arrangement illustrated in FIG. 10.
Figure 16:
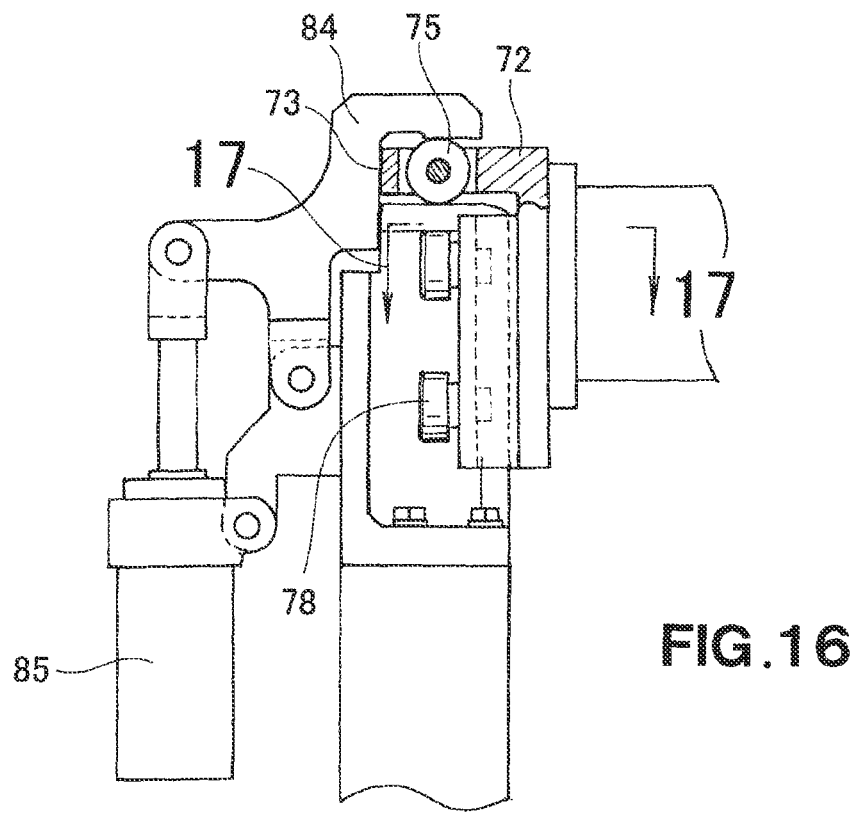
FIG. 16 is a view showing a modification to an arrangement illustrated in FIG. 11.
Figure 17:
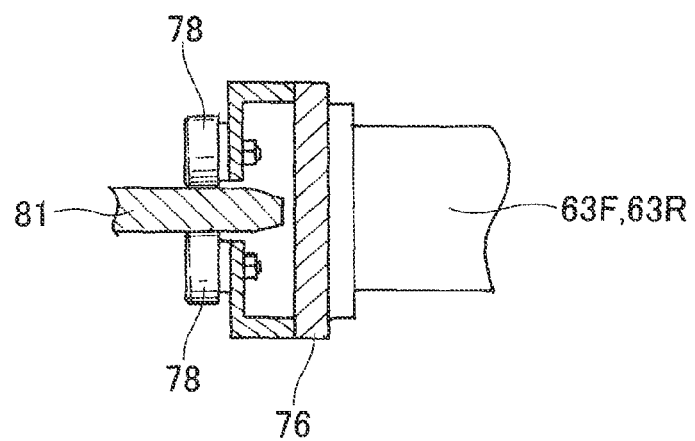
FIG. 17 is a cross-sectional view taken along line 17-17 of FIG. 16.

As shown in FIGS. 15 and 16, the orientation of the guide roller 78 may be changed. As shown in FIG. 17, when the guide rollers 78, 78 move in a direction orthogonal to the sheet of FIG. 17, the guide rollers 78, 78 can smoothly rotate relative to the positioning plate 81.

Figure 18:
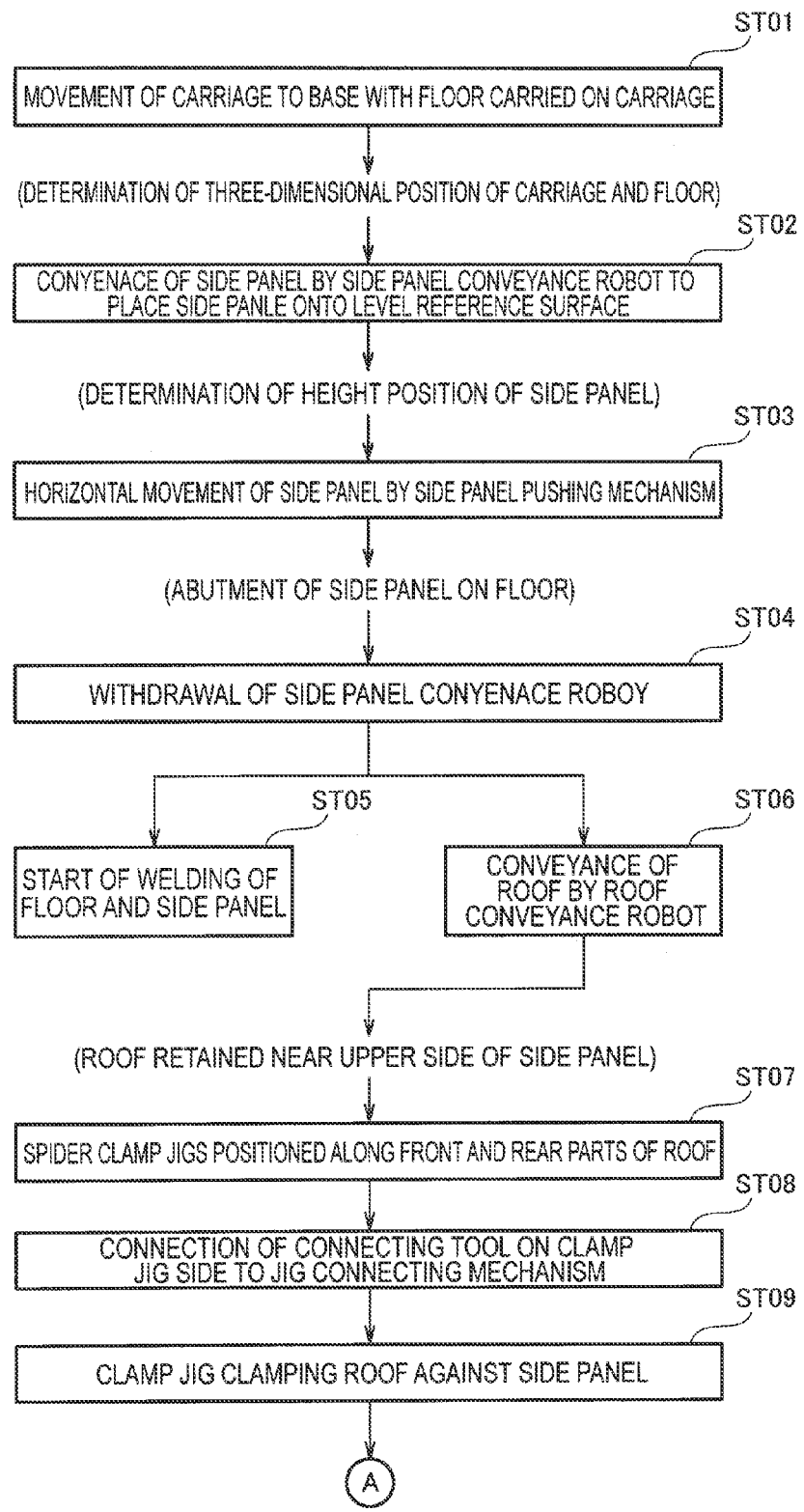
FIG. 18 is a flow chart from a floor positioning step to a roof setting step.

The method for assembling the vehicle body has been fragmentarily discussed above. The method for assembling the vehicle body is systematically discussed below. As shown in FIG. 18, the carriage carrying the floor thereon is drawn onto the base (ST 01). The three-dimensional position of the carriage (in the height, longitudinal and widthwise directions) is determined by placement of the carriage onto the base. Afterward, the side panel is mounted to the positioned floor.

That is, the side panel conveyance robot conveys the side panel onto the level reference surface near the floor (ST 02). The height position of the side panel is determined by the level reference surface.

Next, the side panel pushing mechanism pushes the side panel horizontally (ST 03) to bring the side panel into abutment on the floor.

The side panel conveyance robot, which has finished its role, is detached from the side panel and returned to the waiting position (ST 04). Afterward, the side panel is not restrained by the side panel conveyance robot.

Then, welding the floor and the side panel together is started (ST 05). This welding is performed by the welding gun of the welding robot. Since the welding gun has a function of pressing two or more panels together, the floor and the side panel can be welded together well. That is, the side panel can be welded without being compressed by a strong compression means or being restrained by a strong restraint means.

During ST 05, the roof conveyance robot conveys the roof (ST 06). The roof is retained near the side panel. The spider clamp jigs are positioned along the front and rear parts of the roof 18 (ST 07), but does not yet perform clamping the roof.

The connecting tool on a side of the clamp jig is connected to the jig connecting mechanism on a side of the ground (ST 08). This nearly finishes the positioning of the clamp jig. The clamp jig connects the roof to the side panel by clamping them together (ST 09). The welding is not yet performed.

Figure 19:
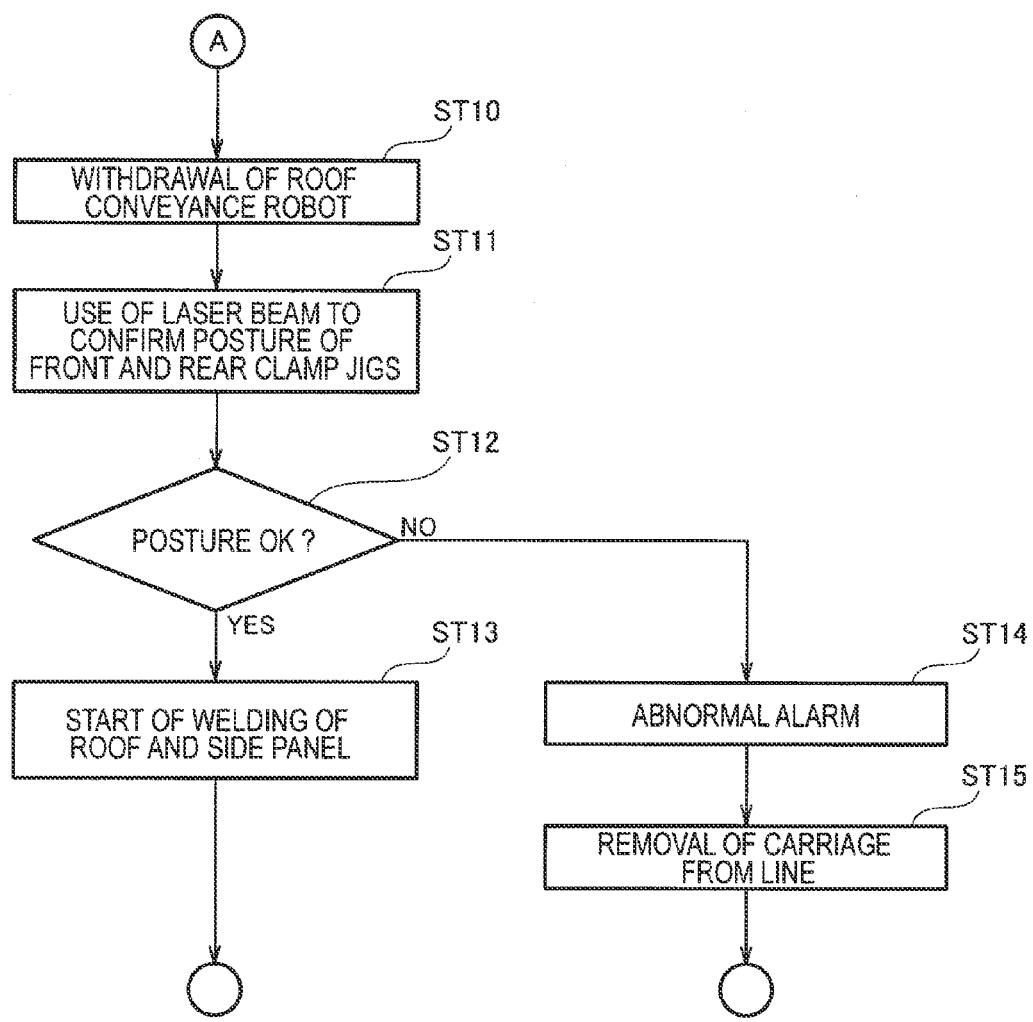
FIG. 19 is a flow chart showing a second robot returning step and the subsequent steps.

As shown in FIG. 19, the roof conveyance robot, which has finished its role, is detached from the roof and returned to the waiting position (ST 10). Afterward, the roof is not restrained by the roof conveyance robot.

Although the positioning of the clamp jig is nearly finished in ST 08, the front or rear clamp jig may be changed in posture due to the detachment of the roof conveyance robot. Also, the clamp jig may not be well engaged with the side panel. Additionally, the roof may undergo inappropriate deformation. Under these various adverse conditions, the front or rear clamp jig may be changed in posture.

In view of this, as a precaution, a relative posture between the front and rear clamp jigs is checked by a laser beam (ST 11). When the relative posture is judged to be good, welding the roof and the side panel together is started (ST 13). When the relative posture is judged to be incorrect, an abnormal alarm issues (ST 14) and the carriage is removed from the assembly line (ST 15).

The summary of the foregoing flow constitutes the method of the present invention. That is, the method of the present invention comprises steps of: positioning the floor ("the floor positioning step") (ST 01); causing the side panel conveyance robot to move the side panel to a vicinity of the floor ("side panel conveyance step") (ST 02); determining the height position of the side panel by moving the side panel onto the level reference surface ("the height position determination step") (ST 02); causing the side panel pushing mechanism to bring the side panel into abutment on the floor ("the side panel abutment step") (ST 03), the side panel pushing mechanism being configured to push the side panel horizontally with a force not deforming the floor; returning the side panel conveyance robot to a waiting position ("the first robot returning step") (ST 04); causing the welding gun to start welding the floor and the side panel together ("the first welding start step") (ST 05); causing the roof conveyance robot to move the roof to a vicinity of the side panel ("the roof conveyance step") (ST 06); causing the clamp mechanism to clamp or press the roof against the side panel ("the roof setting step") (ST 09); returning the roof conveyance robot to the waiting position ("the second robot returning step") (ST 10); and causing the welding gun to start welding the side panel and the roof together ("the second welding start step") (ST 13).

Preferably, between the roof setting step (ST 09) and the second welding start step (ST 13), a step of confirming that the roof is set in a predetermined position relative to the side panel ("roof set state confirmation step") (ST 11) is provided.

INDUSTRIAL APPLICABILITY

The present invention is suitable for assembling the vehicle body by welding the floor, the side panels and the roof to one another.

REFERENCE SIGNS LIST

10 . . . a vehicle body, 13 . . . a floor, 16 . . . a side panel, 18 . . . a roof, 20 . . . a vehicle body assembling apparatus, 21 . . . a carriage, 22 . . . a base, 30 . . . side panel pushing mechanism, 31 . . . first pressing means, 32 . . . second pressing means, 33 . . . a bed 34, 35 . . . rails, 52 . . . a level reference surface, 57 . . . a side panel conveyance robot 58 . . . a welding robot, 59 . . . a welding gun, 60 . . . a clamp mechanism, 61F . . . a front clamp jig (a front spider clamp jig), 61R . . . a rear clamp jig (a rear spider clamp jig), 70 . . . a connecting tool, 80 . . . a jig connecting mechanism, 87 . . . a roof conveyance robot, 90 . . . a clamp mechanism state confirmation mechanism, 91 . . . a laser beam emitting part, 92 . . . a laser beam receiving part

The invention claimed is:

1. A method for assembling a vehicle body by at least welding a floor, a side panel, and a roof to one another, the method comprising:
    a floor positioning step of positioning the floor;
    a side panel conveyance step of causing a side panel conveyance robot to move the side panel to a vicinity of the floor;
    a height position determination step of determining a height position of the side panel by moving the side panel onto a level reference surface which is moved vertically by a cylinder unit so as to be at least one of raised and lowered;
    a side panel abutment step of causing a side panel pushing mechanism to bring the side panel into abutment on the floor, the side panel pushing mechanism being configured to push the side panel horizontally with a force not deforming the floor so as to move the side panel placed on the level reference surface along the level reference surface, which has been moved vertically by the cylinder unit;
    a first robot returning step of returning the side panel conveyance robot to a waiting position;
    a first welding start step of causing a welding gun to start welding the floor and the side panel together;
    a roof conveyance step of causing a roof conveyance robot to move the roof to a vicinity of the side panel;
    a roof setting step of causing a clamp mechanism to clamp or press the roof against the side panel;
    a second robot returning step of returning the roof conveyance robot to a waiting position; and
    a second welding start step of causing the welding gun to start welding the side panel and the roof together,
    wherein the roof conveyance step is performed in parallel with the first welding start step.

2. The method of claim 1, further comprising a roof set state confirmation step of confirming that the roof is set in a predetermined position relative to the side panel, between the roof setting step and the second welding start step.

* * * * *